United States Patent
Wu et al.

(10) Patent No.: US 11,871,444 B2
(45) Date of Patent: *Jan. 9, 2024

(54) TECHNIQUES FOR PRIORITIZING TRANSMISSION OF TYPES OF WIRELESS COMMUNICATIONS

(71) Applicant: QUALCOMM Incorporated, San Diego, CA (US)

(72) Inventors: Zhibin Wu, Los Altos, CA (US); Hong Cheng, Basking Ridge, NJ (US); Sudhir Kumar Baghel, Hillsborough, NJ (US); Kapil Gulati, Belle Mead, NJ (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/329,753

(22) Filed: May 25, 2021

(65) Prior Publication Data

US 2021/0282163 A1    Sep. 9, 2021

Related U.S. Application Data

(63) Continuation of application No. 16/834,748, filed on Mar. 30, 2020, now Pat. No. 11,026,246.

(Continued)

(51) Int. Cl.
*H04W 72/12*    (2023.01)
*H04W 72/566*    (2023.01)

(52) U.S. Cl.
CPC .............................. *H04W 72/569* (2023.01)

(58) Field of Classification Search
None
See application file for complete search history.

(56) References Cited

U.S. PATENT DOCUMENTS 10,779,242 B2    9/2020    Wang et al.
10,834,747 B2    11/2020    Lu et al.
(Continued)

FOREIGN PATENT DOCUMENTS

CN    110536354 A    12/2019
WO    2018082571 A1    5/2018

OTHER PUBLICATIONS

Asustek: "Discussion on UL/SL TX Prioritization", 3GPP Draft; R2-1906541, Discussion on UL SL TX Prioritization, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019 May 13, 2019 (May 13, 2019), XP051730002, 3 pages, Retrieved from the Internet: URL: http://www.3gpp.org/ftp/Meetings%5F3GPP%5FSYNC/RAN2/Docs/R2%2D1906541%2Ezip [retrieved on May 13, 2019].

(Continued)

*Primary Examiner* — Steve R Young
(74) *Attorney, Agent, or Firm* — Dalei Dong; ArentFox Schiff LLP

(57) ABSTRACT

Aspects described herein relate to identifying a sidelink priority value of sidelink traffic to be transmitted via a sidelink channel, identifying a type of uplink traffic to be transmitted via an uplink channel, the uplink traffic is scheduled to be transmitted contemporaneously with the sidelink traffic, prioritizing, based at least in part on the identification of the type of uplink traffic being of a first type uplink traffic, the uplink traffic regardless of the sidelink priority value, and transmitting, based on prioritizing the sidelink traffic or prioritizing the uplink traffic, at least one of the sidelink traffic or the uplink traffic.

12 Claims, 8 Drawing Sheets

Related U.S. Application Data

(60) Provisional application No. 62/877,679, filed on Jul. 23, 2019.

(56) References Cited

U.S. PATENT DOCUMENTS

| | | | |
|---|---|---|---|
| 2017/0230939 A1* | 8/2017 | Rudolf | H04W 88/02 |
| 2017/0245245 A1 | 8/2017 | Kim et al. | |
| 2017/0367087 A1 | 12/2017 | Seo | |
| 2018/0176871 A1* | 6/2018 | Li | H04W 52/383 |
| 2018/0199251 A1 | 7/2018 | Kim et al. | |
| 2018/0234995 A1 | 8/2018 | Jung et al. | |
| 2018/0242234 A1 | 8/2018 | Semaan et al. | |
| 2018/0255499 A1 | 9/2018 | Loehr et al. | |
| 2019/0253977 A1* | 8/2019 | Wang | H04W 40/22 |
| 2019/0335532 A1* | 10/2019 | Kim | H04W 72/12 |
| 2019/0349836 A1 | 11/2019 | Lee et al. | |
| 2020/0045724 A1* | 2/2020 | Lu | H04W 72/21 |
| 2020/0196365 A1 | 6/2020 | Tang et al. | |
| 2020/0205209 A1* | 6/2020 | Pan | H04W 76/14 |
| 2020/0396701 A1* | 12/2020 | Yi | H04W 52/383 |
| 2021/0007002 A1 | 1/2021 | Kang et al. | |
| 2021/0029723 A1 | 1/2021 | Wu et al. | |
| 2021/0168832 A1* | 6/2021 | Zhuo | H04W 72/0406 |
| 2021/0185559 A1* | 6/2021 | Lee | H04L 47/2458 |
| 2021/0204301 A1* | 7/2021 | Lee | H04W 72/566 |

OTHER PUBLICATIONS

Catt: "Prioritization of Uu and SL for NR V2X", 3GPP Draft; R2-1905803, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019, May 13, 2019 (May 13, 2019), XP051729302, 6 pages, Retrieved from the Internet: URL: http://www.3gpp.org/ftp/Meetings%5F3GPP%5FSYNC/RAN2/Docs/R2%2D1905803%2Ezip [retrieved on May 13, 2019].

International Search Report and Written Opinion—PCT/US2020/039170—ISA/EPO—dated Sep. 2, 2020.

LG Electronics: "5G V2X with NR Sidelink", 3GPP Draft; RP-190983, SR for 5GV2X, 3rd Generation Partnership Project (3GPP), Mobile Competence Centre; 650, Route Des Lucioles; F-06921 Sophia-Antipolis Cedex; France vol. TSG RAN, No. Newport Beach, USA; Jun. 3, 2019-Jun. 6, 2019, May 29, 2019 (May 29, 2019), XP051739262, 38 pages, Retrieved from the Internet: URL: http://www.3gpp.org/ftp/tsg%5Fran/TSG%5FRAN/TSGR%5F84/Docs/RP%2D190983%2Ezip [retrieved on May 29, 2019].

LG Electronics Inc: "[Running CR] Introduction of 5G V2X with NR Sidelink", R2-2000235, 3GPP TSG-RAN WG2 Meeting #109-e, Online, Feb. 24-Mar. 6, 2020, 37 pages.

Oppo., et al., "Left Issues on UL/SL Prioritization for NR-V2X", R2-1912071, 3GPP TSG-RAN WG2 Meeting #107bis, Chongqing, China, Oct. 14-Oct. 18, 2019, pp. 1-5.

* cited by examiner

TECHNIQUES FOR PRIORITIZING TRANSMISSION OF TYPES OF WIRELESS COMMUNICATIONS

CLAIM OF PRIORITY UNDER 35 U.S.C. § 119

The present Application for Patent is a continuation of application Ser. No. 16/834,748, entitled "TECHNIQUES FOR PRIORITIZING TRANSMISSION OF TYPES OF WIRELESS COMMUNICATIONS" filed Mar. 30, 2020, which claims priority to Provisional Application No. 62/877,679, entitled "TECHNIQUES FOR PRIORITIZING TRANSMISSION OF TYPES OF WIRELESS COMMUNICATIONS" filed Jul. 23, 2019, which are assigned to the assignee hereof and hereby expressly incorporated by reference herein for all purposes.

FIELD OF THE DISCLOSURE

Aspects of the present disclosure relate generally to wireless communication systems, and more particularly, to techniques for prioritizing transmission of certain types of wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Thus, a user equipment (UE) can be configured to transmit multiple different types of traffic.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, an apparatus for wireless communication is provided that includes a memory configured to store instructions, and one or more processors communicatively coupled with the memory. The one or more processors are configured to execute the instructions to cause the apparatus to identify a sidelink priority value of sidelink traffic to be transmitted via a sidelink channel, identify a type of uplink traffic to be transmitted via an uplink channel, the uplink traffic is scheduled to be transmitted contemporaneously with the sidelink traffic, prioritize, based at least in part on the identification of the type of uplink traffic being of a first type uplink traffic, the uplink traffic regardless of the sidelink priority value, and transmit, based on prioritizing the sidelink traffic or prioritizing the uplink traffic, at least one of the sidelink traffic or the uplink traffic.

One or more of the above examples includes wherein the first type includes random access channel (RACH) uplink communications.

One or more of the above examples includes wherein the one or more processors are configured to execute the instructions to cause the apparatus to prioritize, based at least in part on the identification of the type of uplink traffic not being of the first type uplink traffic, the uplink traffic or the sidelink traffic where the sidelink priority value is less than a sidelink threshold priority value.

One or more of the above examples includes wherein the one or more processors are configured to execute the instructions to cause the apparatus to prioritize, based at least in part on the identification of the type of uplink traffic not being of the first type uplink traffic, the uplink traffic or sidelink traffic based on an uplink priority value.

One or more of the above examples includes wherein the uplink priority value indicates the uplink traffic includes ultra-reliable low-latency communications (URLLC) uplink traffic.

One or more of the above examples includes wherein the one or more processors are configured to execute the instructions to cause the apparatus to prioritize, based at least in part on the identification of the type of uplink traffic not being of the first type uplink traffic, the sidelink traffic where the uplink priority value is equal to one.

One or more of the above examples includes wherein the one or more processors are configured to execute the instructions to cause the apparatus to prioritize, based at least in part on the identification of the type of uplink traffic not being of the first type uplink traffic, the sidelink traffic where the uplink traffic is a physical uplink control channel (PUCCH) or a physical uplink shared channel (PUSCH) transmission.

One or more of the above examples includes wherein the one or more processors are configured to execute the instructions to cause the apparatus to prioritize, based at least in part on the identification of the type of uplink traffic not being of the first type uplink traffic, the sidelink traffic where the sidelink priority value is less than an uplink priority value of the uplink traffic.

One or more of the above examples includes wherein the sidelink priority value is indicated in a physical sidelink control channel (PSCCH).

One or more of the above examples includes wherein the sidelink priority value is associated with a PC5 fifth generation (5G) quality-of-service (QoS) indicator (5QI) (PQI).

According to another example, a method for wireless communication at a user equipment (UE) is provided that includes identifying a sidelink priority value of sidelink traffic to be transmitted via a sidelink channel, identifying a type of uplink traffic to be transmitted via an uplink channel, the uplink traffic is scheduled to be transmitted contemporaneously with the sidelink traffic, prioritizing, based at least in part on the identification of the type of uplink traffic being of a first type uplink traffic, the uplink traffic regardless of the sidelink priority value, and transmitting, based on prioritizing the sidelink traffic or prioritizing the uplink traffic, at least one of the sidelink traffic or the uplink traffic.

One or more of the above examples includes wherein the first type includes RACH uplink communications.

One or more of the above examples includes prioritizing, based at least in part on the identification of the type of uplink traffic not being of the first type uplink traffic, the uplink traffic or the sidelink traffic where the sidelink priority value is less than a sidelink threshold priority value.

One or more of the above examples includes wherein prioritizing the uplink traffic or the sidelink traffic includes prioritizing, based at least in part on the identification of the type of uplink traffic not being of the first type uplink traffic, the uplink traffic or sidelink traffic based on an uplink priority value.

One or more of the above examples includes wherein the uplink priority value indicates the uplink traffic includes ultra-reliable low-latency communications (URLLC) uplink traffic.

One or more of the above examples includes wherein prioritizing the uplink traffic or the sidelink traffic includes prioritizing, based at least in part on the identification of the type of uplink traffic not being of the first type uplink traffic, the sidelink traffic where the uplink priority value is equal to one.

One or more of the above examples includes wherein prioritizing the uplink traffic or the sidelink traffic includes prioritizing, based at least in part on the identification of the type of uplink traffic not being of the first type uplink traffic, the sidelink traffic where the uplink traffic is a PUCCH or a PUSCH transmission.

One or more of the above examples includes wherein prioritizing the uplink traffic or the sidelink traffic includes prioritizing, based at least in part on the identification of the type of uplink traffic not being of the first type uplink traffic, the sidelink traffic where the sidelink priority value is less than an uplink priority value of the uplink traffic.

One or more of the above examples includes wherein the sidelink priority value is indicated in a PSCCH.

One or more of the above examples includes wherein the sidelink priority value is associated with a PQI.

According to another examples, an apparatus for wireless communication is provided that includes means for identifying a sidelink priority value of sidelink traffic to be transmitted via a sidelink channel, means for identifying a type of uplink traffic to be transmitted via an uplink channel, the uplink traffic is scheduled to be transmitted contemporaneously with the sidelink traffic, means for prioritizing, based at least in part on the identification of the type of uplink traffic being of a first type uplink traffic, the uplink traffic regardless of the sidelink priority value, and means for transmitting, based on prioritizing the sidelink traffic or prioritizing the uplink traffic, at least one of the sidelink traffic or the uplink traffic.

One or more of the above examples includes wherein the first type includes RACH uplink communications.

One or more of the above examples includes wherein the means for prioritizing prioritizes, based at least in part on the identification of the type of uplink traffic not being of the first type uplink traffic, the uplink traffic or the sidelink traffic where the sidelink priority value is less than a sidelink threshold priority value.

One or more of the above examples includes wherein the means for prioritizing prioritizes, based at least in part on the identification of the type of uplink traffic not being of the first type uplink traffic, the uplink traffic or sidelink traffic based on an uplink priority value.

One or more of the above examples includes wherein the uplink priority value indicates the uplink traffic includes URLLC uplink traffic.

According to another example, a non-transitory computer-readable medium is provided that includes code executable by one or more processors for wireless communication. The code includes code for identifying a sidelink priority value of sidelink traffic to be transmitted via a sidelink channel, identifying a type of uplink traffic to be transmitted via an uplink channel, the uplink traffic is scheduled to be transmitted contemporaneously with the sidelink traffic, prioritizing, based at least in part on the identification of the type of uplink traffic being of a first type uplink traffic, the uplink traffic regardless of the sidelink priority value, and transmitting, based on prioritizing the sidelink traffic or prioritizing the uplink traffic, at least one of the sidelink traffic or the uplink traffic.

One or more of the above examples includes wherein the first type includes RACH uplink communications.

One or more of the above examples includes wherein the code for prioritizing prioritizes, based at least in part on the identification of the type of uplink traffic not being of the first type uplink traffic, the uplink traffic or the sidelink traffic where the sidelink priority value is less than a sidelink threshold priority value.

One or more of the above examples includes wherein the code for prioritizing prioritizes, based at least in part on the identification of the type of uplink traffic not being of the first type uplink traffic, the uplink traffic or sidelink traffic based on an uplink priority value.

One or more of the above examples includes wherein the uplink priority value indicates the uplink traffic includes URLLC uplink traffic.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
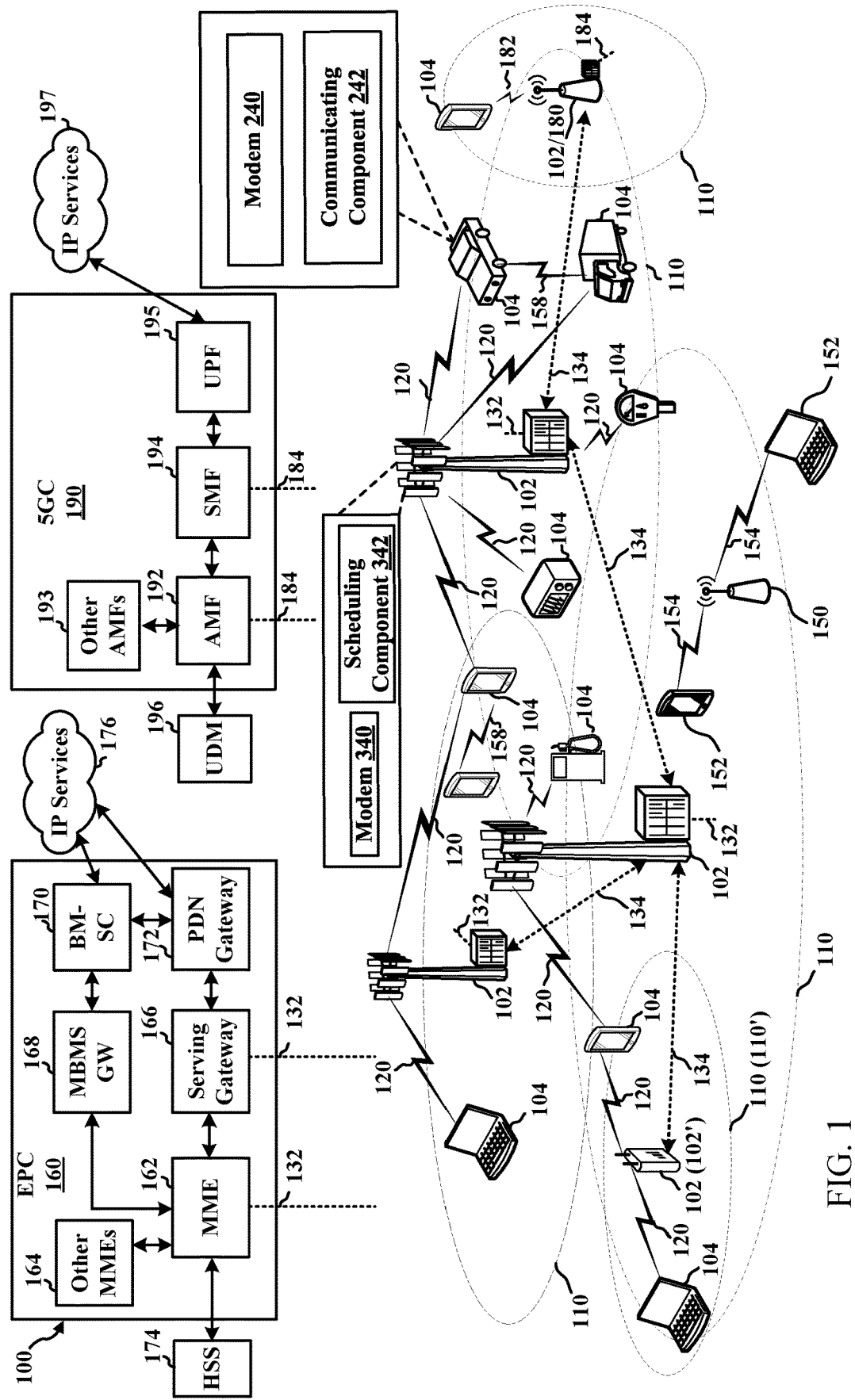
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to prioritizing certain types of traffic in wireless communications. For example, a user equipment (UE) can be configured for uplink communications with a base station and also D2D communications with other UEs. D2D communications can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure nodes over a sidelink channel. Though some concepts are generally described in terms of V2X communications/devices, the concepts can be similarly applied more generally to D2D communications/devices to achieve similar functionalities.

In this example, a UE can determine to prioritize sidelink communications over uplink communications or vice versa, as described further herein. For example, in third generation partnership project (3GPP) long term evolution (LTE), multiple cases can be supported regarding the capability of V2X devices on the simultaneous transmission of uplink and sidelink communications. The cases may include a first case where uplink transmissions and sidelink transmissions use separate transmit chains and separate power budget; in this first case, there may be no need to prioritize communications. The cases may include a second case where uplink transmissions and sidelink transmissions use separate transmit chains but share power budget; in this second case prioritizing may include power sharing between uplink and sidelink transmissions where the transmissions overlap in time (e.g., but the UE may not know a prior power sharing in case of conflict in look ahead and may use a conservative decision on power sharing, e.g., worst-case assumption to always do power-sharing). The cases may include a third case where uplink transmissions and sidelink transmissions share transmit chains and power budget; in this third case, prioritizing may include dropping one or the other transmission. In one example, a configured priority threshold can be to compare the sidelink packet quality-of-service (QoS), transmit or yield to the uplink transmission. In another example, exceptions can be made for certain transmissions that can always be prioritized over sidelink transmission (e.g., for random access channel (RACH) messages, such as message 1 and/or message 3, for physical uplink shard channel (PUSCH) transmission for emergency protocol data unit (PDU) connection, etc.).

In addition, in LTE, the following can be performed: compare sidelink traffic with pre-defined priority threshold; single out uplink traffic to be always prioritized over sidelink traffic. In this example, the threshold can be configured to be low enough, that all uplink traffic is prioritized. In one example, configuration of sidelink SL pro-se per-packet priority (PPPP) threshold may only allow for considering which sidelink traffic is important and which sidelink traffic is not, but may not allow for considering whether the uplink traffic is important or not. Thus, in this example, some important uplink traffic may get the same treatment with other uplink traffic, when comparing to the same sidelink traffic.

In examples described herein, the UE can prioritize sidelink and/or uplink communications based on additional or different considerations, such as a priority level defined for the communications or a priority level defined for the corresponding logical channel, based on one or more rules for determining priority for the type of communications, which may be configured by a base station or otherwise determined by the UE, and/or the like. In another example, the priority can be determined based on a type of channel or signaling being transmitted. In another specific example, certain types of traffic can be prioritized over other types of traffic based on one or more rules for determining priority, which may be configured by the base station or otherwise determined by the UE. For example, the UE can determine prioritize uplink ultra-reliable low-latency communications (URLLC) traffic over sidelink and other uplink traffic. In any case, for example, prioritizing communications can include transmitting the communications while dropping other communications in a same or similar period of time, transmitting the communications using a higher transmit power than used for other communications in a same or similar period of time, etc.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for prioritizing certain types of communications. In addition, some nodes may have a modem 340 and scheduling component 342 for scheduling and/or indicating priority for certain types of communication, as described herein. Though a UE 104 is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications.

In an example, a UE 104 can be configured to communicate with other UEs/nodes over a sidelink channel (e.g., in D2D or V2X communications) and can be configured to communicate with a base station 102 over an uplink channel. In this example, communicating component 242 can determine to prioritize transmission of sidelink or uplink communications, as described herein. For example, sidelink transmissions and uplink transmission may overlap in a shared component carrier (e.g., where corresponding channels use the same or overlapping component carrier). In some cases (e.g., where the UE 104 can use different transmit chains), both transmissions can occur but may need to share a transmit power cap. In other cases (e.g., where the UE 104 can use a single transmit chain), the UE 104 may be able to select only one transmission. Thus, communicating component 242 can determine priority for sidelink or uplink communications, as described herein, where the priority can result in selecting a transmit power or dropping certain types of traffic, etc. Moreover, in an example, communicating component 242 can determine priority for certain types of uplink traffic (e.g., URLLC) over others. In one example, scheduling component 342 may configure one or more rules or other priority information to facilitate the UE 104 determining how to prioritize sidelink or uplink transmissions (and/or transmissions for certain types of uplink traffic), as described further herein.

Figure 4A:
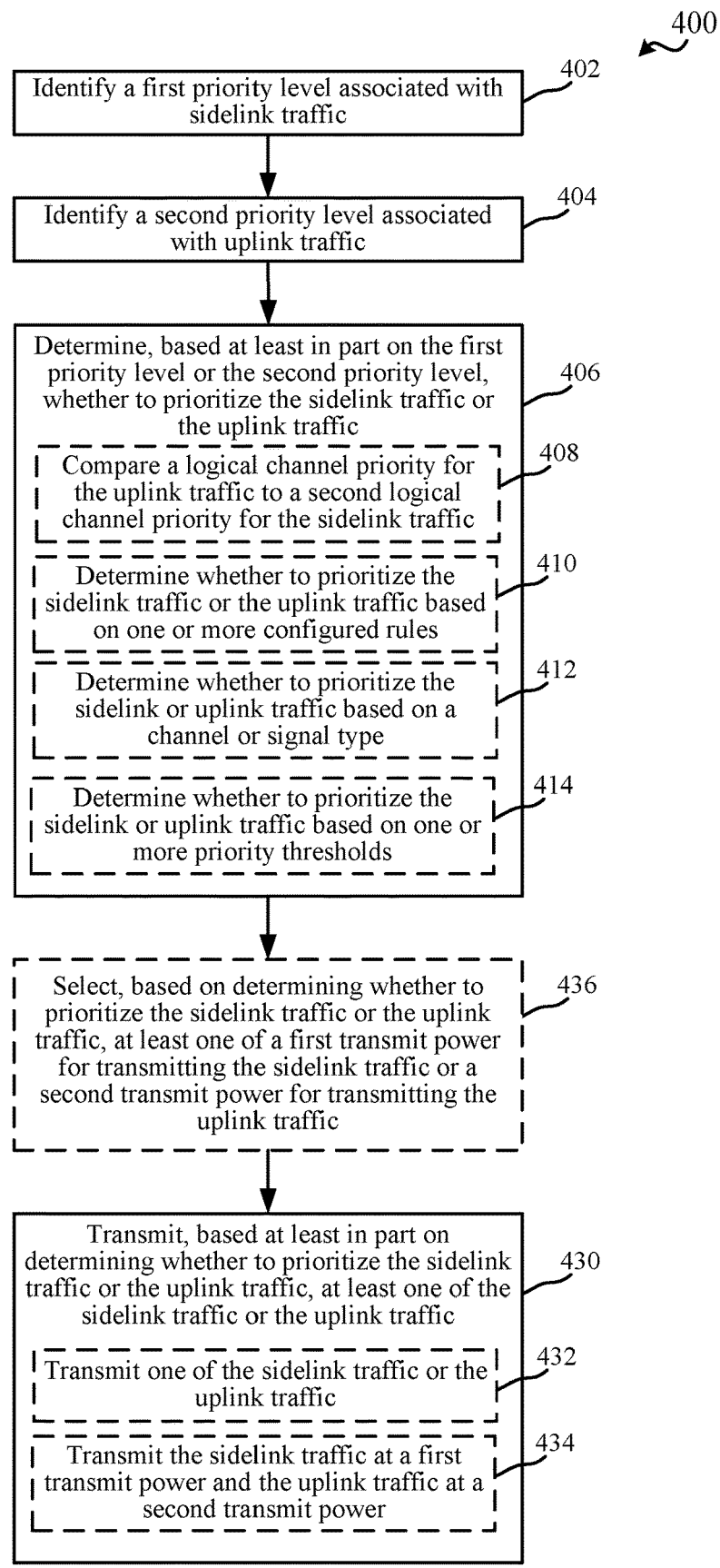
FIG. 4A is a flow chart illustrating an example of a method for prioritizing certain types of communications, in accordance with various aspects of the present disclosure.
Figure 4B:
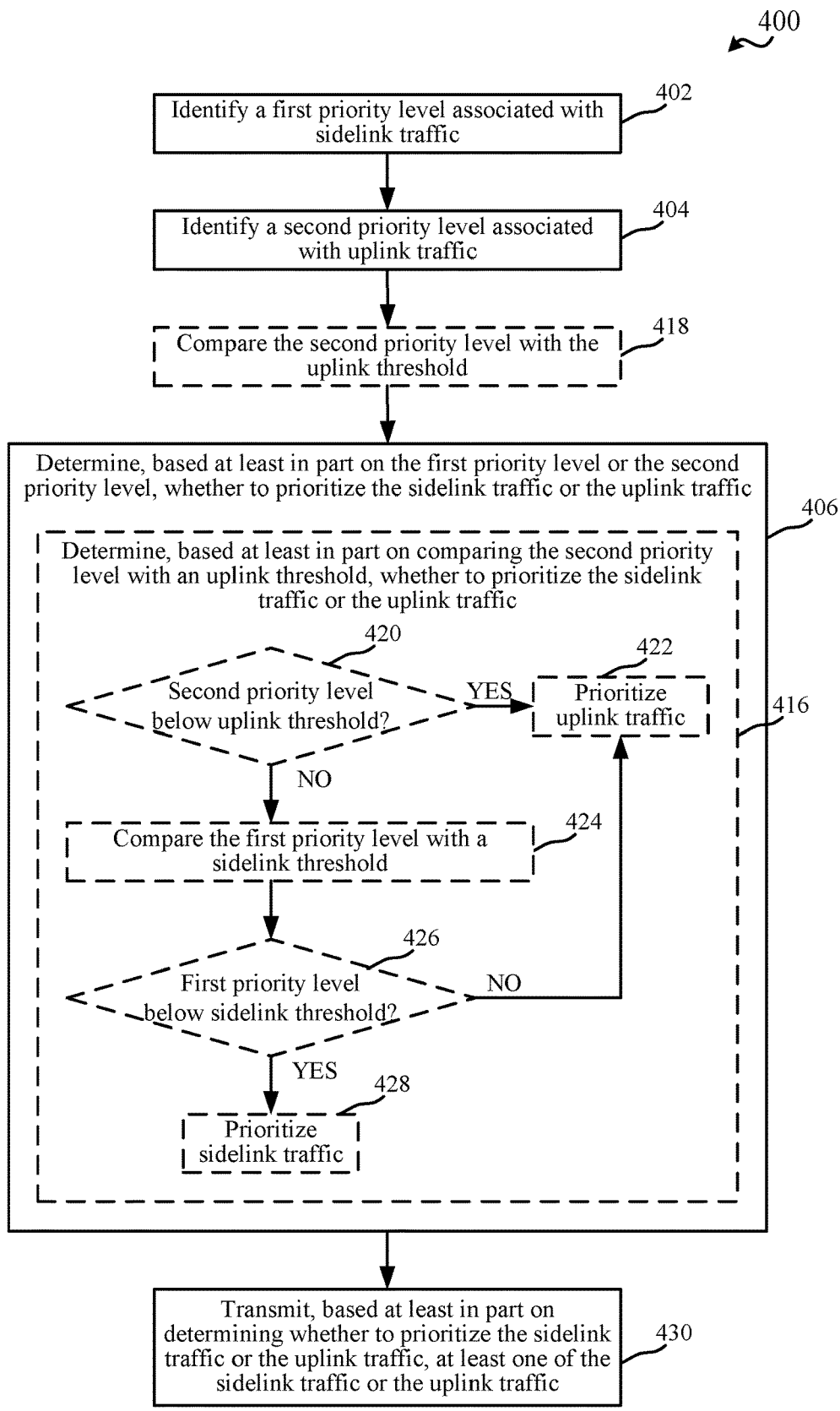
FIG. 4B is a flow chart illustrating an example of a method for prioritizing certain types of communications based on comparing a priority level to a threshold, in accordance with various aspects of the present disclosure.
Figure 5:
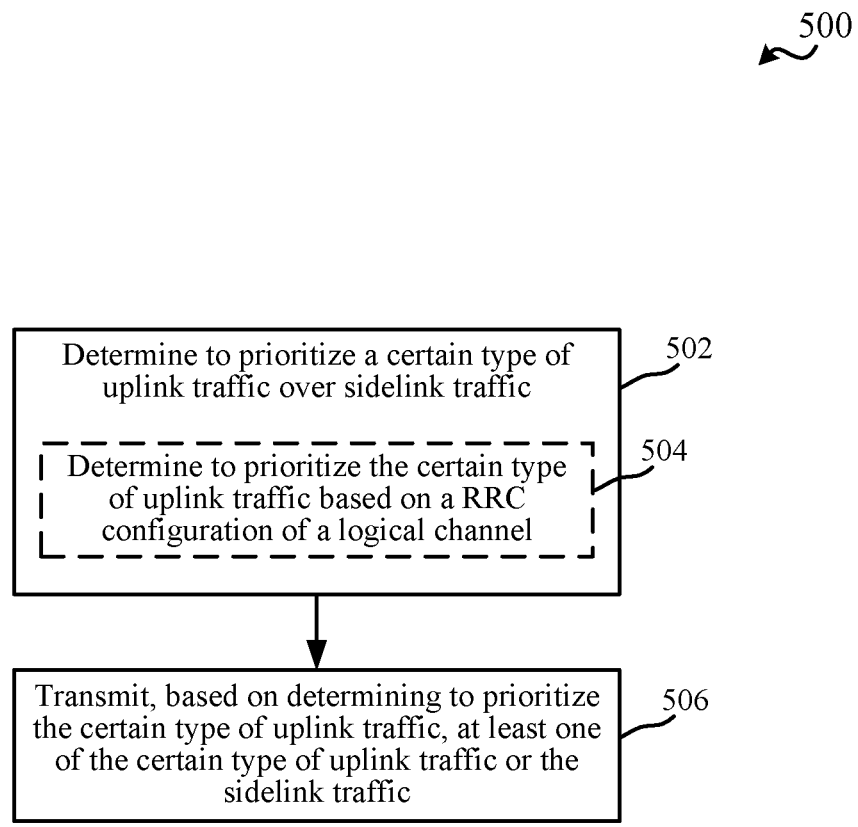
FIG. 5 is a flow chart illustrating an example of a method for prioritizing certain types of uplink communications, in accordance with various aspects of the present disclosure.
Figure 6:
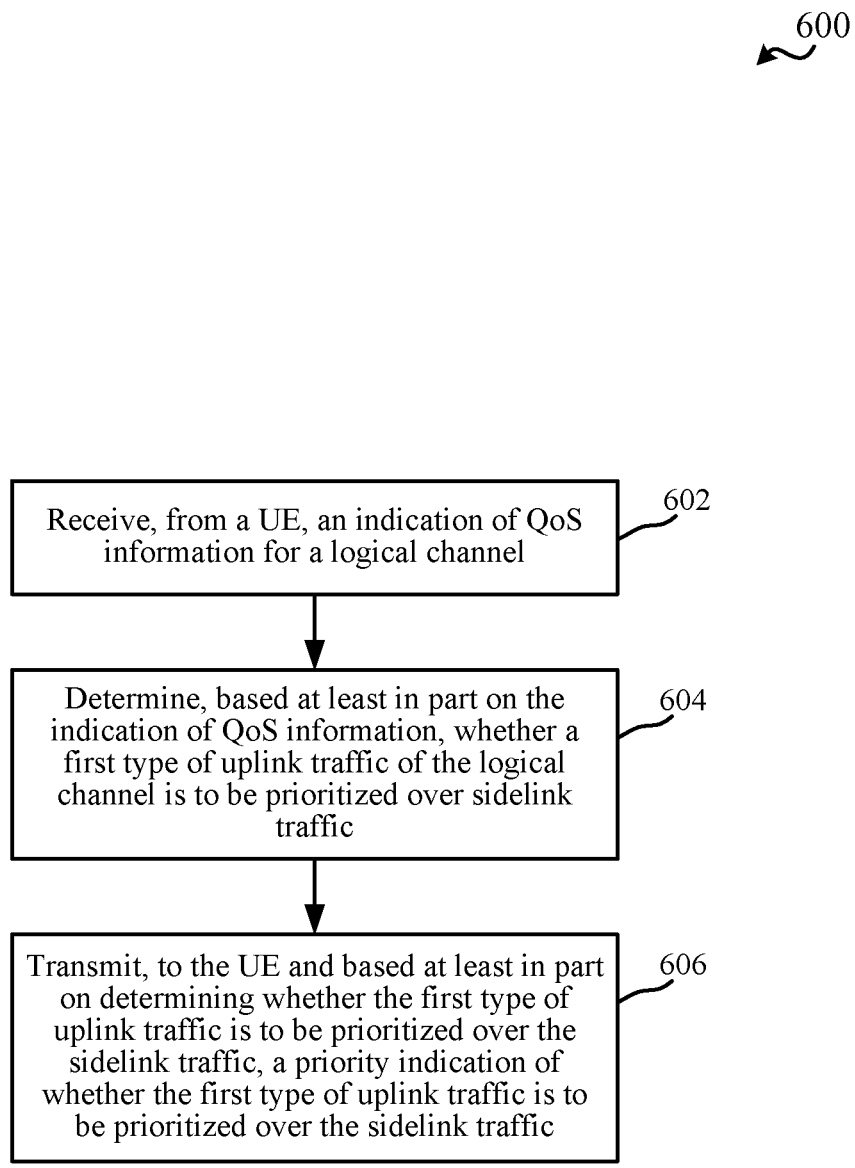
FIG. 6 illustrates an example of a system for configuring priority for communications, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
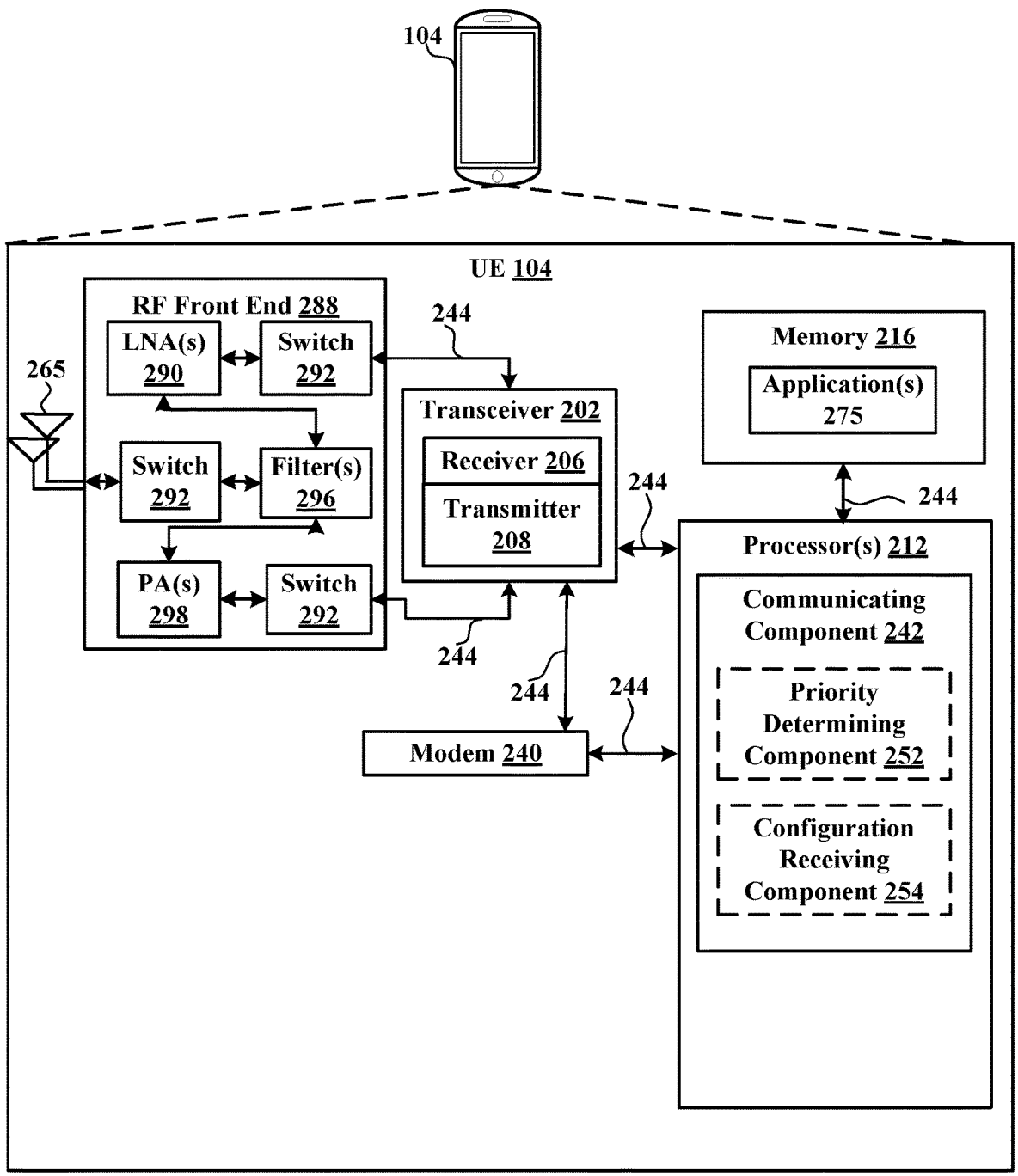
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for prioritizing certain types of communications, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a priority determining component 252 for determining priority for transmitting different types of communications, and/or a configuration receiving component 254 for receiving a configuration indicating one or more rules, thresholds, or other parameters related to determining a priority for different types of communications, as described herein.

In an aspect, the processor(s) 212 may correspond to one or more of the processors described in connection with the UE in FIG. 7. Similarly, the memory 216 may correspond to the memory described in connection with the UE in FIG. 7.

Figure 3:
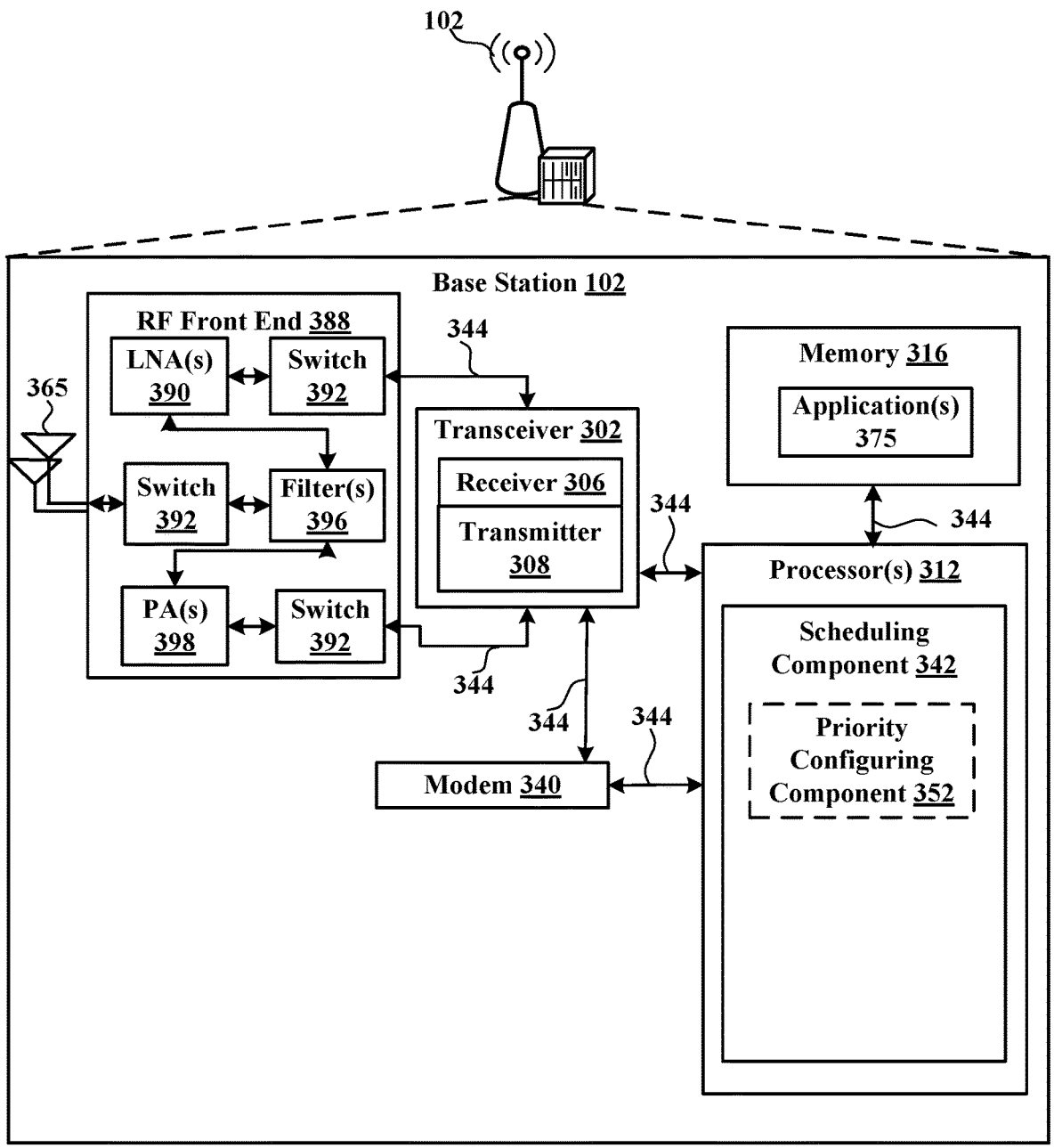
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling communications and/or indicating one or more rules or other information to facilitate determining a priority for transmitting communications, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a priority configuring component 352 for configuring a priority or related rules, thresholds, or other indications for determining priority for different types of communications, as described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4A illustrates a flow chart of an example of a method 400 for prioritizing certain types of communications in accordance with aspects described herein. In one example, a UE 104 can perform the functions described in method 400 using one or more of the components described in FIGS. 1 and 2. FIG. 4B illustrates a flow chart of a specific example of the method 400 for prioritizing certain types of communications based on comparing one or more priority levels to one or more thresholds in accordance with aspects described herein. In one example, a UE 104 can perform the functions described in method 400 using one or more of the components described in FIGS. 1 and 2.

In method 400, at Block 402, a first priority level associated with sidelink traffic can be identified. In an aspect, priority determining component 252, e.g., in conjunction with processor(s) 212, memory 216, transceiver 202, communicating component 242, etc., can identify the first priority level associated with the sidelink traffic. For example, priority determining component 252 can identify the first priority level as, or based on, a logical channel (LCH) priority indicated for a sidelink channel used to transmit the sidelink traffic (e.g., PSSCH, PSCCH, etc.), QoS information indicated for a corresponding bearer (e.g., 5G QoS indicator (5QI), PC5-5QI (PQI) etc.), and/or the like. In one example, priority determining component 252 can determine the first priority level as associated with a media access control (MAC) protocol data unit (PDU), where the priority level associated with the MAC PDU may be based on priority levels of one or more sidelink LCHs in the MAC PDU (e.g., as the highest priority level among the LCHs in the MAC PDU). Thus, in an example, priority determining component 252 can determine the first priority level at a MAC layer (e.g., based on priority values specific to the MAC layer).

In method 400, at Block 404, a second priority level associated with uplink traffic can be identified. In an aspect, priority determining component 252, e.g., in conjunction with processor(s) 212, memory 216, transceiver 202, communicating component 242, etc., can identify the second priority level associated with the uplink traffic. For example, priority determining component 252 can identify the second priority level as, or based on, a LCH priority indicated for an uplink channel used to transmit the uplink traffic (e.g., PUSCH, PUCCH, etc.), QoS information indicated for a corresponding bearer (e.g., 5G QoS indicator (5QI), PQI, etc.), and/or the like. In one example, priority determining component 252 can determine the second priority level as associated with a MAC PDU, where the priority level associated with the MAC PDU may be based on priority levels of one or more uplink LCHs in the MAC PDU (e.g., as the highest priority level among the LCHs in the MAC PDU). Thus, in an example, priority determining component 252 can determine the second priority level at a MAC layer (e.g., based on priority values specific to the MAC layer).

In method 400, at Block 406, it can be determined, based at least in part on the first priority level or the second priority level, whether to prioritize the sidelink traffic or the uplink traffic. In an aspect, priority determining component 252, e.g., in conjunction with processor(s) 212, memory 216, transceiver 202, communicating component 242, etc., can determine, based at least in part on the first priority level or the second priority level, whether to prioritize the sidelink traffic or the uplink traffic. For example, priority determining component 252 can determine whether to prioritize a given PDU to be transmitted over a sidelink channel or another given PDU to be transmitted over an uplink channel in the same or overlapping time periods (and/or in the same or overlapping frequency resources). In an example, determining whether to prioritize the sidelink traffic or the uplink traffic can be based on priority determining component 252 also determining that first resources for transmitting the sidelink traffic and second resource for transmitting the uplink traffic (e.g., as indicated in corresponding received resource grants) overlap in time (e.g., include one or more of the same OFDM symbols) and/or frequency (e.g., include one or more of the same resource blocks or resource elements). In one example, priority determining component 252 can generally identify the first priority level and second priority level as, or based on, respective QoS requirements for the sidelink traffic and uplink traffic, and determine whether to prioritize the sidelink or uplink traffic based on the QoS requirements (e.g., based on comparing the QoS requirements with corresponding thresholds or to one another, etc.). In an example, this may allow for more granularity to differentiate sidelink and uplink traffic, and priority among the traffic can be adjusted with RRC reconfiguration by the base station 102.

In one example, a unified metric can be used to evaluate both uplink and sidelink traffic to determine priority. For example, where a sidelink or uplink logical channel is configured, the priority associated with each logical channel can be determined to represent the ranking (e.g., importance) of the traffic among all uplink and sidelink traffic (e.g., instead of only among sidelink or uplink traffic) for prioritizing one or the other type of traffic. For example, in determining whether to prioritize the sidelink traffic or uplink traffic at Block 406, optionally at Block 408, a logical channel priority for the uplink traffic can be compared to a second logical channel priority for the sidelink traffic, where the logical channel priorities can be configured for each channel (e.g., for a PSSCH for sidelink traffic and for PUSCH for uplink traffic). In an aspect, priority determining component 252, e.g., in conjunction with processor(s) 212, memory 216, transceiver 202, communicating component 242, etc., can compare the logical channel priority for the uplink traffic to the second logical channel priority for the sidelink traffic to determine whether to prioritize the uplink or sidelink traffic. In this example, priority determining component 252 can prioritize the uplink or sidelink traffic based on the LCH priority and regardless of whether the LCH is for sidelink or uplink traffic. In another example, priority determining component 252 can prioritize the uplink or sidelink traffic based on comparing the LCH priorities to respective thresholds, as described herein.

In one example, where a MAC PDU includes data from multiple logical channels, priority determining component 252 can use the priority of highest priority LCH using the corresponding link to compare in determining uplink/sidelink prioritization. As described, for example, priority for LCH can be configured using RRC signaling from a base station 102 (e.g., system information block (SIB) signaling, dedicated signaling for a given UE, etc.). In another example, the logical channel priority may be configured (e.g., for sidelink radio bearers (SLRBs) to which LCHs are associated), may be indicated in control data for the channel or corresponding resource grants, etc. Moreover, in an example, the logical channel priority can be indicated in a MAC header of communications transmitted over the logical channel.

In another example, priority determining component 252 can identify a priority level for sidelink and/or uplink traffic based on unifying a priority setting of 5QI and/or PQI (e.g., PC5 5QI, where PC5 can be a sidelink interface), so it can be directly compared for the sidelink and uplink traffic (or associated bearers). In this example, when bearers are established for the QoS flow of a certain 5QI/PQI, that priority can be inherited and used for comparison. The priorities between SL and UL are not necessarily different in the above examples, and in this case, priority determining component 252 may use one or more rules to prefer either uplink or sidelink traffic if the identified priority is same. In one example, this rule may be configured by the network (e.g., by base station 102). Thus, in one example, in determining whether to prioritize the sidelink traffic or uplink traffic at Block 406, optionally at Block 410, it can be determined whether to prioritize the sidelink traffic or the uplink traffic based on one or more configured rules. In an aspect, priority determining component 252, e.g., in conjunction with processor(s) 212, memory 216, transceiver 202, communicating component 242, etc., can determine whether to prioritize the sidelink traffic or the uplink traffic based on the one or more configured rules. For example, priority determining component 252 may receive or determine the one or more configured rules based on a configuration stored in UE 104 or received from base station 102 (e.g., in RRC signaling, such as SIB or other broadcast signaling, dedicated signaling, etc.).

In addition, in one example, the first priority level may be identified based on QoS information and the second priority level may be identified based on logical channel priority. For example, priority determining component 252 can determine the first priority level for the sidelink traffic based on PPPP (e.g., for LTE V2X UEs or otherwise). In this example, the first priority level of the transmission using a sidelink resource grant can be based on QoS. A PC5 5QI priority level can be defined for sidelink data as part of the QoS profile. Some sidelink traffic may not have PQI (e.g., PC5-RRC messages or sidelink MAC control element (CE) or other portion of a MAC header), and priority determining component 252 can determine a default priority level for such signaling (e.g., which can be configured by the network—e.g., by base station 102). In addition, in this example, if the sidelink LCH priority is used to compare with uplink traffic, a certain set of rules to map the QoS (e.g., PQI priority level) to the LCH priority level can be specified to facilitate consistent comparison (e.g., where a connected mode UE obtains the sidelink LCH priority configured in per-UE signaling). In one example, the rules mapping the QoS to LCH can be included in the one or more configured rules described above with respect to Block 410, which can be configured in the UE 104, received in a network configuration, etc. Thus, in one example, the priority determining component 252 may determine an LCH for the channel that maps to a QoS value (e.g., 5QI, PQI, etc.), and can compare the LCH to another LCH of another channel, a threshold, etc., as described herein, to determine whether to prioritize traffic of the channel. In addition, for example, a "priority" parameter transmitted in sidelink PSCCH channel can be consistent with the sidelink priority levels used in uplink/sidelink prioritization schemes described herein. For example, the "priority" parameter can be identical, or at least the ranking can be consistent with that used in uplink/sidelink prioritization.

In another example, in determining whether to prioritize the sidelink traffic or uplink traffic at Block 406, optionally at Block 412, it can be determined whether to prioritize the sidelink traffic or the uplink traffic based on a channel or signal type. In an aspect, priority determining component 252, e.g., in conjunction with processor(s) 212, memory 216, transceiver 202, communicating component 242, etc., can determine whether to prioritize the sidelink traffic or the uplink traffic based on the channel or signal type. For example, priority determining component 252 can determine whether to prioritize sidelink or uplink traffic based on one or more exceptions, such as to prioritize RACH communications, emergency PDN communications (e.g., plus NR layer 1/layer 2 uplink communication), etc. over other sidelink and uplink traffic regardless of indicated priority. In one example, priority determining component 252 can determine a priority for some signaling based on a LCH to which the signaling is associated. For example, scheduling request (SR), buffer status report (BSR), HARQ ACK, etc., associated with a PUSCH may have a LCH that is of a high priority (e.g., a highest priority such that these communications are prioritized over other communications). In one example, priority determining component 252 can determine a priority for other communications not having an associated QoS, such as channel quality indicator (CQI), channel state information (CSI), sounding reference signal (SRS), etc., which can always be deprioritized or can be prioritized over certain sidelink traffic (e.g., sidelink traffic having a priority that does not achieve a threshold, as described in the examples below). In addition, priority determining component 252 can use the other mechanisms described herein for determining priority for other sidelink and/or uplink traffic.

In yet another example, in determining whether to prioritize the sidelink traffic or uplink traffic at Block 406, optionally at Block 414, it can be determined whether to prioritize the sidelink traffic or the uplink traffic based on one or more priority thresholds. In an aspect, priority determining component 252, e.g., in conjunction with processor(s) 212, memory 216, transceiver 202, communicating component 242, etc., can determine whether to prioritize the sidelink traffic or the uplink traffic based on one or more priority thresholds. In this example, priority determining component 252 can prioritize one of sidelink traffic or uplink traffic where the identified priority level achieves (or does not achieve) one or more thresholds (e.g., regardless of whether the priority level is lower than a priority for the other one of the sidelink traffic or uplink traffic). For example, the threshold(s) can be specified in a configuration stored in the UE 104 and/or received from the network (e.g., from base station 102). In one example, the threshold may be part of the one or more configured rules described in connection with Block 410 above. In addition, for example, the sidelink traffic and uplink traffic can have associated thresholds where priority determining component 252 can determine to prioritize uplink traffic if the uplink traffic achieves the uplink priority threshold, e.g., regardless of the sidelink traffic priority. In another example, priority determining component 252 can determine to prioritize sidelink traffic if the uplink traffic does not achieve the uplink priority threshold and/or if the sidelink traffic achieves the sidelink priority threshold.

In yet another example, priority determining component 252 can determine to prioritize uplink traffic if the priority level of the uplink traffic achieves the uplink priority threshold. In this example, if the priority level of the uplink traffic does not achieve the uplink priority threshold, priority determining component 252 can determine to prioritize sidelink traffic if the priority level of the sidelink traffic achieves the sidelink priority threshold. In this example, if the priority level of the sidelink traffic does not achieve the sidelink priority threshold, priority determining component 252 can determine to prioritize the uplink traffic. Moreover, in an example, priority determining component 252 can determine priority level for uplink traffic that is related to sidelink communications, such as SR, BSR, etc., as being the sidelink priority (e.g., instead of uplink priority for uplink traffic). Similarly, in an example, priority determining component 252 can determine a priority threshold for uplink traffic that is related to sidelink communications, such as SR, BSR, etc., as being the sidelink priority threshold (e.g., instead of uplink priority threshold for uplink traffic). In these examples, priority determining component 252 may determine whether to prioritize the uplink traffic related to sidelink communications based on comparing the sidelink priority to the sidelink priority threshold (or comparing the sidelink priority to the uplink priority threshold, comparing the uplink priority to the sidelink priority threshold, etc.).

In comparing priority levels to thresholds or to one another, as described herein, it is to be appreciated that the highest priority may have the lowest value for priority level (e.g., priority=1 can be the highest priority). In this regard, for example, in referring to determining whether the priority achieves a threshold, priority determining component 252 can determine whether the priority is less than (or equal to) a threshold. In other examples, the highest priority may have the highest value for priority level (e.g., priority=1 can be the lowest priority). In this regard, for example, in referring to determining whether the priority achieves a threshold, priority determining component 252 can determine whether the priority is greater than (or equal to) a threshold.

In a first example, priority determining component 252 can prioritize communications as follows: (1) RACH communications, emergency PDN communications (e.g., plus NR layer 1/layer 2 uplink communication), etc., and then (2) sidelink and uplink communications based on LCH priority, as described above. In one alternative of this example, other uplink traffic (e.g., uplink traffic not having an associated QoS) can always be deprioritized. In one specific example, the RACH communications, emergency PDN communications (e.g., plus NR layer 1/layer 2 uplink communication), etc. may be prioritized based on having a LCH with a high priority (e.g., a highest priority over other LCH priorities possible for other sidelink and/or uplink communications, or at least of a priority that achieves a threshold for prioritizing the communications).

In a second example, priority determining component 252 can prioritize communications as follows: (1) RACH communications, emergency PDN communications (e.g., plus NR layer 1/layer 2 uplink communication), etc.; then (2) sidelink communications having a priority level that achieves a threshold; and then (3) sidelink and uplink communications based on LCH priority, as described above. In one alternative of this example, other uplink traffic (e.g., uplink traffic not having an associated QoS) can always be deprioritized.

In a third example, priority determining component 252 can prioritize communications as follows: (1) RACH communications, emergency PDN communications (e.g., plus NR layer 1/layer 2 uplink communication), etc.; then (2) sidelink and uplink communications based on LCH priority, as described above; and then (3) sidelink communications having a priority level that does not achieve a threshold. In one alternative of this example, other uplink traffic (e.g., uplink traffic not having an associated QoS) can always be deprioritized. In another alternative of this example, the other uplink traffic (e.g., uplink traffic not having an associated QoS) can be prioritized above the sidelink communications having the priority level that does not achieve the threshold.

In a fourth example, priority determining component 252 can prioritize communications as follows: (1) RACH communications, emergency PDN communications (e.g., plus NR layer 1/layer 2 uplink communication), etc.; then (2) sidelink communications having a priority level that achieves a first threshold; then (3) sidelink and uplink communications based on LCH priority, as described above; and then (4) sidelink communications having a priority level that does not achieve a second threshold. In one alternative of this example, other uplink traffic (e.g., uplink traffic not having an associated QoS) can always be deprioritized. In another alternative of this example, the other uplink traffic (e.g., uplink traffic not having an associated QoS) can be prioritized above the sidelink communications having the priority level that does not achieve the threshold.

In these examples, the introduction of threshold(s) can also be realized by keeping those sidelink traffic to be assigned with highest LCH priority in the ranking system. Using separate thresholds can allow for keeping the option that some sidelink traffic can always deprioritized, when compared to any uplink traffic. In addition, when using separate thresholds, a separate independent metric can be used to determine sidelink priority (e.g., used to compare with a configured threshold), which can be other than the LCH priority determination (e.g., up to the network/base station 102). Using separate thresholds can also work in the case that where unified uplink/sidelink ranking configuration is not available, e.g. a UE 104 camps on a cell which the base station 102 does not support sidelink configurations. When threshold is used in the above examples, sidelink traffic that achieves a threshold and sidelink traffic for which LCH priority is considered for prioritization can be mixed in the same MAC PDU, in which case the PDU can inherit the higher priority, in one example.

In yet another example, priority determining component 252 can prioritize communications of different radio access technologies (RATs). For example, priority determining component 252 can prioritize NR uplink traffic and can compare with LTE sidelink traffic having a priority level that achieves a PPPP threshold in determining whether to prioritize the NR uplink or LTE sidelink. In another example, priority determining component 252 can prioritize NR sidelink traffic or LTE uplink traffic similar to one or more of the options described above. In one example, LTE solution can be reused (assuming legacy eNB, as same as NR Out of Coverage (OOC) case).

The method 400 as shown in FIG. 4B illustrates an example where determining whether to prioritize the sidelink traffic or the uplink traffic is based on comparing one or more priority levels to one or more thresholds. Method 400 in FIG. 4B includes similar Blocks 402, 404, 406, 430 as shown and described in reference to method 400 in FIG. 4A herein, and provides further examples of determining whether to prioritize sidelink traffic or uplink traffic in Block 406. As shown in FIG. 4B in method 400, and pursuant to some examples descried above, in determining whether to prioritize the sidelink traffic or the uplink traffic at Block 406, optionally at Block 416, whether to prioritize the sidelink traffic or the uplink traffic can be determined based at least in part on comparing the second priority level with an uplink threshold. In an aspect, priority determining component 252, e.g., in conjunction with processor(s) 212, memory 216, transceiver 202, communicating component 242, etc., can determine, based at least in part on comparing the second priority level with the uplink threshold, whether to prioritize the sidelink traffic or the uplink traffic.

In this example, in method 400 as shown in FIG. 4B, optionally at Block 418, the second priority level can be compared with the uplink threshold. In an aspect, priority determining component 252, e.g., in conjunction with processor(s) 212, memory 216, transceiver 202, communicating component 242, etc., can compare the second priority level with the uplink threshold. As described, this can include comparing the second priority level to the uplink threshold to determine whether the second priority level is below the uplink threshold, or less than or equal to the uplink threshold (which may indicate to prioritize the uplink traffic where lower priority level or value corresponds to higher actual priority). In another example, however, higher priority level or value can correspond to higher actual priority, and this comparing the second priority level to the uplink threshold in this example may include determining whether the second priority level is above the uplink threshold, or greater than or equal to the uplink threshold (which may indicate to prioritize the uplink traffic).

In determining whether to prioritize the sidelink traffic or the uplink traffic at Block 416, optionally at Block 420, it can be determined whether the second priority level is below the uplink threshold. In an aspect, priority determining component 252, e.g., in conjunction with processor(s) 212, memory 216, transceiver 202, communicating component 242, etc., can determine whether the second priority level is below the uplink threshold. If so, optionally at Block 422, the uplink traffic can be prioritized, and priority determining component 252, e.g., in conjunction with processor(s) 212, memory 216, transceiver 202, communicating component 242, etc., can accordingly prioritize the uplink traffic. If the second priority level is not below the uplink threshold, optionally at Block 424, the first priority level can be compared with a sidelink threshold. In an aspect, priority determining component 252, e.g., in conjunction with processor(s) 212, memory 216, transceiver 202, communicating component 242, etc., can accordingly compare the first priority level with the sidelink threshold.

In this example, optionally at Block 426, it can be determined whether the first priority level is below the sidelink threshold. In an aspect, priority determining component 252, e.g., in conjunction with processor(s) 212, memory 216, transceiver 202, communicating component 242, etc., can determine whether the first priority level is below the sidelink threshold. If so, optionally at Block 428, the sidelink traffic can be prioritized, and priority determining component 252, e.g., in conjunction with processor(s) 212, memory 216, transceiver 202, communicating component 242, etc., can accordingly prioritize the sidelink traffic. If the first priority level is not below the sidelink threshold, optionally at Block 422, the uplink traffic can be prioritized, and priority determining component 252, e.g., in conjunction with processor(s) 212, memory 216, transceiver 202, communicating component 242, etc., can accordingly prioritize the uplink traffic.

Referring back to FIG. 4A (and FIG. 4B), in method 400, at Block 430, at least one of the sidelink traffic or the uplink traffic can be transmitted based on determining whether to prioritize the sidelink traffic or the uplink traffic. In an aspect, communicating component 242, e.g., in conjunction with processor(s) 212, memory 216, transceiver 202, etc., can transmit, based at least in part on determining whether to prioritize the sidelink traffic or the uplink traffic, at least one of the sidelink traffic or the uplink traffic. For example, this can be based on the priority levels, as described above, based on priority levels for certain types of traffic or of other channels, as described further herein, etc. Moreover, prioritization can include transmitting one type of communication and dropping one or more other types of communication, transmitting one type of communication with a higher transmit power than used for other types of communication, etc.

In one example, in transmitting at least one of the sidelink traffic or the uplink traffic at Block 430, optionally at Block 432, one of the sidelink traffic or the uplink traffic can be transmitted. In an aspect, communicating component 242, e.g., in conjunction with processor(s) 212, memory 216, transceiver 202, etc., can transmit one of the sidelink traffic or the uplink traffic (e.g., and can drop the other one of the sidelink traffic or the uplink traffic) based on the determined prioritization.

In another example, in transmitting at least one of the sidelink traffic or the uplink traffic at Block 430, optionally at Block 434, the sidelink traffic can be transmitted at a first transmit power and the uplink traffic can be transmitted at a second transmit power. In an aspect, communicating component 242, e.g., in conjunction with processor(s) 212, memory 216, transceiver 202, etc., can transmit the sidelink traffic at the first transmit power and the uplink traffic at the second transmit power. For example, the first and second transmit powers can be indicative of the prioritization, and the sidelink traffic and uplink traffic can be concurrently transmitted based on the respective transmit powers.

In this example, in method 400, optionally at Block 436, at least one of a first transmit power for transmitting the sidelink traffic or a second transmit power for transmitting the uplink traffic can be selected based on determining whether to prioritize the sidelink traffic or the uplink traffic.

In an aspect, priority determining component 252, e.g., in conjunction with processor(s) 212, memory 216, transceiver 202, communicating component 242, etc., can select, based on determining whether to prioritize the sidelink traffic or the uplink traffic, at least one of the first transmit power for transmitting the sidelink traffic or the second transmit power for transmitting the uplink traffic. For example, priority determining component 252 can determine a higher transmit power for the traffic determined to have the higher priority and a lower transmit power for the traffic determined to have the lower priority. The transmit powers can be within a transmit power budget configured for the UE 104. In one example, priority determining component 252 can determine the higher transmit power and then determine the lower transmit power as the higher transmit power subtracted from the power budget of the UE 104 (and/or vice versa). In any case, communicating component 242 can transmit the sidelink traffic according to the first transmit power and the uplink traffic according to the second transmit power to prioritize the traffic, as described.

FIG. 5 illustrates a flow chart of another example of a method 500 for prioritizing certain types of communications in accordance with aspects described herein. In one example, a UE 104 can perform the functions described in method 500 using one or more of the components described in FIGS. 1 and 2.

In method 500, at Block 502, it can be determined to prioritize a certain type of uplink traffic over sidelink traffic. In an aspect, priority determining component 252, e.g., in conjunction with processor(s) 212, memory 216, transceiver 202, communicating component 242, etc., can determine to prioritize the certain type of uplink traffic over sidelink traffic (and/or other types of traffic). For example, priority determining component 252 can determine to prioritize URLLC traffic over sidelink traffic and/or other types of traffic (e.g., eMBB traffic). In an example, priority determining component 252 can determine to prioritize the certain type of uplink traffic based on a configuration stored in the UE 104 or otherwise received from the network (e.g., from base station 102).

In determining to prioritize the certain type of uplink traffic at Block 502, optionally at Block 504, it can be determined to prioritize the certain type of uplink traffic based on a RRC configuration of a logical channel. In an aspect, priority determining component 252, e.g., in conjunction with processor(s) 212, memory 216, transceiver 202, communicating component 242, etc., can determine to prioritize the certain type of uplink traffic based on the RRC configuration of the logical channel, where the logical channel can correspond to the certain type of uplink traffic. For example, the RRC configuration may include an indicator to prioritize the certain type of uplink traffic and/or to otherwise prioritize communications transmitted over the logical channel. For example, the RRC configuration can be used to inform the MAC layer of the selected uplink communications to be prioritized.

In one example, the configuration may include using a certain 5QI to prioritize the certain type of uplink communications. In another example, for LCH or dedicated radio bearer (DRB) configuration, a special indication can be added in RRCConnectionReconfigure message to mark this special LCH does not use the sidelink/uplink prioritization described above (e.g., in connection with method 400), but rather can always be prioritized over sidelink traffic (and/or other uplink traffic). In yet another example, the LCH for a channel carrying URLLC traffic can be of a higher priority than a channel carrying eMBB traffic.

In one example, similarly as in the examples described above with reference to method 400, in determining to prioritize the certain type of traffic at Block 502, priority determining component 252 can accordingly prioritize the certain type of uplink traffic with (e.g., as it would prioritize) RACH communications, emergency PDN communications, etc., which can be prioritized over all other sidelink traffic and uplink traffic. In another example, priority determining component 252 can prioritize communications as follows: (1) RACH communications, emergency PDN communications (e.g., plus NR layer 1/layer 2 uplink communication) and the certain type of uplink communications that may be indicated by RRC configuration (e.g., URLLC), etc.; then (2) sidelink traffic with a priority level that achieves a PPPP threshold; then (3) uplink traffic; and then (4) sidelink traffic with a priority level that does not achieve the PPPP threshold.

In method 500, at Block 506, at least one of the certain type of uplink traffic or the sidelink traffic can be transmitted based on determining to prioritize the certain type of uplink traffic. In an aspect, communicating component 242, e.g., in conjunction with processor(s) 212, memory 216, transceiver 202, etc., can transmit, based on determining to prioritize the certain type of uplink traffic, at least one of the certain type of uplink traffic or the sidelink traffic. As described, for example, communicating component 242 can transmit the certain type of uplink traffic and drop any other sidelink and/or other traffic. In another example, as described, communicating component 242 can transmit the certain type of uplink traffic at a first transmit power and also transmit other sidelink and/or other traffic at other transmit power(s) lower than the first transmit power to prioritize the certain type of uplink traffic.

FIG. 6 illustrates a flow chart of an example of a method 600 for configuring priority for certain types of communications in accordance with aspects described herein. In one example, a UE 104 can perform the functions described in method 600 using one or more of the components described in FIGS. 1 and 3.

In method 600, at Block 602, an indication of QoS information for a logical channel can be received from a UE. In an aspect, priority configuring component 352, e.g., in conjunction with processor(s) 312, memory 316, transceiver 302, scheduling component 342, etc., can receive, from the UE (e.g., UE 104) the indication of QoS information for the logical channel. For example, scheduling component 342 can establish a DRB with the UE 104 for communicating therewith over one or more LCHs. Scheduling component 342 can also provide information regarding a logical channel to the UE 104, and the UE can transmit an indication of QoS information for communications transmitted over the logical channel, such as PCI, 5QI, etc.

In method 600, at Block 604, it can be determined, based at least in part on the indication of the QoS information, whether a first type of uplink traffic of the logical channel is to be prioritized over the sidelink traffic. In an aspect, priority configuring component 352, e.g., in conjunction with processor(s) 312, memory 316, transceiver 302, scheduling component 342, etc., can determine, based at least in part on the indication of QoS information, whether the first type of uplink traffic of the logical channel is to be prioritized over sidelink traffic. For example, priority configuring component 352 can determine that the first type of uplink traffic is to be prioritized where the QoS information achieves a threshold and/or is of a higher priority than QoS information for other LCHs established with the UE 104. In one example, the QoS information may indicate QoS for URLLC traffic.

In method 600, at Block 606, a priority indication of whether the first type of uplink traffic is to be prioritized over the sidelink traffic can be transmitted to the UE based at least in part on determining whether the first type of uplink traffic is to be prioritized over the sidelink traffic. In an aspect, priority configuring component 352, e.g., in conjunction with processor(s) 312, memory 316, transceiver 302, scheduling component 342, etc., can transmit, to the UE and based at least in part on determining whether the first type of uplink traffic is to be prioritized over the sidelink traffic, the priority indication of whether the first type of uplink traffic is to be prioritized over the sidelink traffic. For example, priority configuring component 352 can transmit the priority indication in RRC configuration for the LCH, as described above. The UE 104 can receive the priority indication and can accordingly determine to prioritize transmissions over the LCH, as described above.

Figure 7:
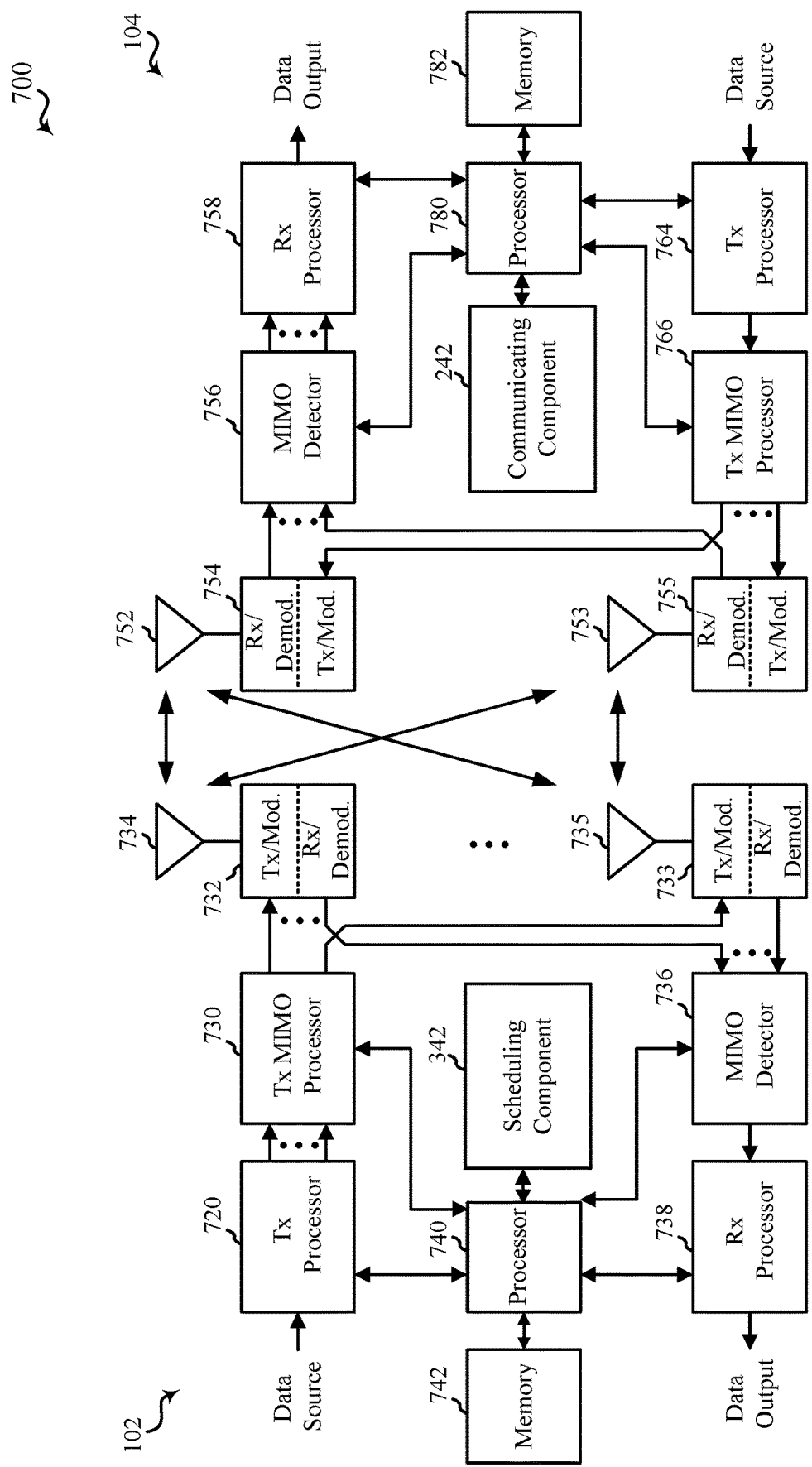
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104, in accordance with various aspects of the present disclosure. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a memory configured to store instructions; and
one or more processors communicatively coupled with the memory, wherein the one or more processors are configured to execute the instructions to cause the apparatus to:
identify a sidelink priority value of sidelink traffic to be transmitted via a sidelink channel;
identify a type of uplink traffic to be transmitted via an uplink channel, the uplink traffic is scheduled to be transmitted contemporaneously with the sidelink traffic, the sidelink priority value indicating a higher priority for the sidelink traffic than for the uplink traffic;
prioritize, based at least in part on the identification of the type of uplink traffic being of a first type uplink traffic, the uplink traffic regardless of the sidelink priority value, wherein the first type includes random access channel (RACH) uplink communications;
prioritize, based at least in part on the identification of the type of uplink traffic not being RACH uplink communications and where the sidelink priority value is less than a sidelink threshold priority value, the sidelink traffic where an uplink priority value is equal to one, indicating that the uplink traffic includes ultra-reliable low-latency communications (URLLC) uplink traffic; and
transmit, based on prioritizing the sidelink traffic or prioritizing the uplink traffic, at least one of the sidelink traffic or the uplink traffic.

2. The apparatus of claim 1, wherein the one or more processors are configured to execute the instructions to cause the apparatus to prioritize, based at least in part on the identification of the type of uplink traffic not being of the first type uplink traffic, the sidelink traffic where the uplink traffic is a physical uplink control channel (PUCCH) or a physical uplink shared channel (PUSCH) transmission.

3. The apparatus of claim 1, wherein the sidelink priority value is indicated in a physical sidelink control channel (PSCCH).

4. The apparatus of claim 1, wherein the sidelink priority value is associated with a PC5 fifth generation (5G) quality-of-service (QoS) indicator (5QI) (PQI).

5. A method for wireless communication at a user equipment (UE), comprising:
identifying a sidelink priority value of sidelink traffic to be transmitted via a sidelink channel;
identifying a type of uplink traffic to be transmitted via an uplink channel, the uplink traffic is scheduled to be transmitted contemporaneously with the sidelink traffic, the sidelink priority value indicating a higher priority for the sidelink traffic than for the uplink traffic;
prioritizing, based at least in part on the identification of the type of uplink traffic being of a first type uplink traffic, the uplink traffic regardless of the sidelink priority value, wherein the first type includes random access channel (RACH) uplink communications;
prioritizing, based at least in part on the identification of the type of uplink traffic not being RACH uplink communications and where the sidelink priority value is less than a sidelink threshold priority value, the sidelink traffic where an uplink priority value is equal to one, indicating that the uplink traffic includes ultra-reliable low-latency communications (URLLC) uplink traffic; and
transmitting, based on prioritizing the sidelink traffic or prioritizing the uplink traffic, at least one of the sidelink traffic or the uplink traffic.

6. The method of claim 5, wherein prioritizing the uplink traffic or the sidelink traffic includes prioritizing, based at least in part on the identification of the type of uplink traffic not being of the first type uplink traffic, the sidelink traffic where the uplink traffic is a physical uplink control channel (PUCCH) or a physical uplink shared channel (PUSCH) transmission.

7. The method of claim 5, wherein the sidelink priority value is indicated in a physical sidelink control channel (PSCCH).

8. The method of claim 5, wherein the sidelink priority value is associated with a PC5 fifth generation (5G) quality-of-service (QoS) indicator (5QI) (PQI).

9. An apparatus for wireless communication, comprising:
means for identifying a sidelink priority value of sidelink traffic to be transmitted via a sidelink channel;
means for identifying a type of uplink traffic to be transmitted via an uplink channel, the uplink traffic is scheduled to be transmitted contemporaneously with the sidelink traffic, the sidelink priority value indicating a higher priority for the sidelink traffic than for the uplink traffic;
means for prioritizing, based at least in part on the identification of the type of uplink traffic being of a first type uplink traffic, the uplink traffic regardless of the sidelink priority value, wherein the first type includes random access channel (RACH) uplink communications;
means for prioritizing, based at least in part on the identification of the type of uplink traffic not being RACH uplink communications and where the sidelink priority value is less than a sidelink threshold priority value, the sidelink traffic where an uplink priority value is equal to one, indicating that the uplink traffic includes ultra-reliable low-latency communications (URLLC) uplink traffic; and
means for transmitting, based on prioritizing the sidelink traffic or prioritizing the uplink traffic, at least one of the sidelink traffic or the uplink traffic.

10. The apparatus of claim 9, wherein the means for prioritizing the uplink traffic or the sidelink traffic prioritizes, based at least in part on the identification of the type of uplink traffic not being of the first type uplink traffic, the sidelink traffic where the uplink traffic is a physical uplink control channel (PUCCH) or a physical uplink shared channel (PUSCH) transmission.

11. A non-transitory computer-readable medium, comprising code executable by one or more processors for wireless communication, the code comprising code for:
identifying a sidelink priority value of sidelink traffic to be transmitted via a sidelink channel;

identifying a type of uplink traffic to be transmitted via an uplink channel, the uplink traffic is scheduled to be transmitted contemporaneously with the sidelink traffic, the sidelink priority value indicating a higher priority for the sidelink traffic than for the uplink traffic;

prioritizing, based at least in part on the identification of the type of uplink traffic being of a first type uplink traffic, the uplink traffic regardless of the sidelink priority value, wherein the first type includes random access channel (RACH) uplink communications;

prioritizing, based at least in part on the identification of the type of uplink traffic not being RACH uplink communications and where the sidelink priority value is less than a sidelink threshold priority value, the sidelink traffic where an uplink priority value is equal to one, indicating that the uplink traffic includes ultra-reliable low-latency communications (URLLC) uplink traffic; and transmitting, based on prioritizing the sidelink traffic or prioritizing the uplink traffic, at least one of the sidelink traffic or the uplink traffic.

12. The non-transitory computer-readable medium of claim 11, wherein the code for prioritizing the uplink traffic or the sidelink traffic prioritizes, based at least in part on the identification of the type of uplink traffic not being of the first type uplink traffic, the sidelink traffic where the uplink traffic is a physical uplink control channel (PUCCH) or a physical uplink shared channel (PUSCH) transmission.

\* \* \* \* \*